United States Patent
Wakahara et al.

(10) Patent No.: US 7,797,924 B2
(45) Date of Patent: Sep. 21, 2010

(54) ABNORMALITY DIAGNOSIS APPARATUS FOR SECONDARY AIR SUPPLY SYSTEM OF ENGINE

(75) Inventors: Keiji Wakahara, Inazawa (JP);
Masahiko Yamaguchi, Obu (JP);
Satoshi Kodo, Nagoya (JP)

(73) Assignee: Denso Corporation, Kariya (JP)

( * ) Notice: Subject to any disclaimer, the term of this patent is extended or adjusted under 35 U.S.C. 154(b) by 1120 days.

(21) Appl. No.: 11/261,588

(22) Filed: Oct. 31, 2005

(65) Prior Publication Data

US 2006/0090455 A1    May 4, 2006

(30) Foreign Application Priority Data

Oct. 29, 2004    (JP)    ............................... 2004-316556

(51) Int. Cl.
*F01N 3/00*    (2006.01)
(52) U.S. Cl. .............................. 60/277; 60/307; 60/293; 60/289; 60/285; 60/284
(58) Field of Classification Search .................. 60/272, 60/277, 273–274, 284–289, 293, 299, 307
See application file for complete search history.

(56) References Cited

U.S. PATENT DOCUMENTS

| | | | | |
|---|---|---|---|---|
| 4,299,089 A | * | 11/1981 | Takeda | 60/290 |
| 5,412,943 A | * | 5/1995 | Hosoya | 60/276 |
| 5,560,199 A | * | 10/1996 | Agustin et al. | 60/274 |
| 6,830,043 B2 | * | 12/2004 | Morinaga et al. | 123/698 |
| 6,883,323 B2 | * | 4/2005 | Hummel | 60/606 |
| 6,918,245 B2 | | 7/2005 | Hirooka et al. | |
| 2003/0061805 A1 | | 4/2003 | Hirooka et al. | |
| 2004/0159312 A1 | | 8/2004 | Hummel | |

FOREIGN PATENT DOCUMENTS

| | | | |
|---|---|---|---|
| JP | 2003-83048 | | 3/2003 |
| JP | 2004-293426 | | 10/2004 |
| JP | 2004293426 A | * | 10/2004 |

OTHER PUBLICATIONS

Office Action dated Sep. 17, 2009 issued in corresponding Japanese Application No. 2004-316556 and an at least partial English-language translation thereof.

* cited by examiner

*Primary Examiner*—Thomas E Denion
*Assistant Examiner*—Jesse Bogue
(74) *Attorney, Agent, or Firm*—Nixon & Vanderhye P.C.

(57) ABSTRACT

An abnormality diagnosis apparatus is used for a secondary air supply system for an internal combustion engine. The system includes an air pump for supplying secondary air into an upstream of a catalyst in an exhaust gas passage of the internal combustion engine. A secondary air detecting means detects secondary air information. An abnormality diagnosis means performs an abnormality diagnosis of the secondary air supply system in accordance with the secondary air information detected using the secondary air detecting means. A temperature information determining means performs at least one of detection and estimation of air pump temperature information. A condition setting means performs at least one of setting and compensating a condition for evaluating normality and abnormality of the secondary air supply system in accordance with the air pump temperature information.

22 Claims, 6 Drawing Sheets

FIG. 4

ΔT DATA MAP

| A (g/sec) \ CP(s) | 0 | 2 | 4 | 6 | 8 | 10 | ... | ... |
|---|---|---|---|---|---|---|---|---|
| 0 | 0.000 | 0.002 | 0.005 | 0.009 | 0.015 | 0.028 | ... | ... |
| 5 | 0.000 | 0.003 | 0.007 | 0.012 | 0.022 | 0.040 | ... | ... |
| 10 | 0.000 | 0.004 | 0.010 | 0.017 | 0.031 | 0.057 | ... | ... |
| 15 | 0.000 | 0.005 | 0.014 | 0.025 | 0.044 | 0.082 | ... | ... |
| 20 | 0.000 | 0.007 | 0.017 | 0.031 | 0.055 | 0.102 | ... | ... |
| 25 | 0.000 | 0.009 | 0.022 | 0.040 | 0.072 | 0.132 | ... | ... |
| 30 | 0.000 | 0.012 | 0.031 | 0.057 | 0.100 | 0.185 | ... | ... |

FIG. 5

| TSA(°C) | 0 | 10 | 20 | 30 | 40 | 50 |
|---|---|---|---|---|---|---|
| KTH(kPa) | 7.2 | 6.9 | 6.7 | 6.5 | 6.4 | 6.4 |

ABNORMALITY DIAGNOSIS APPARATUS FOR SECONDARY AIR SUPPLY SYSTEM OF ENGINE

CROSS REFERENCE TO RELATED APPLICATIONS

This application is based on and incorporates herein by reference Japanese Patent Application No. 2004-316556 filed on Oct. 29, 2004.

FIELD OF THE INVENTION

The present invention relates to an abnormality diagnosis apparatus for a secondary air supply system for an internal combustion engine, the secondary air supply system having an air pump for supplying secondary air to the upstream of an exhaust gas purifying catalyst in an exhaust passage of the internal combustion engine.

BACKGROUND OF THE INVENTION

Secondary air supply systems are disclosed in US 2003/0061805 A1 (JP-A-2003-83048) and U.S. Pat. No. 6,918,245 B2 (JP-A-2004-11585). Specifically, secondary air is supplied to the upstream of a catalyst in an exhaust passage of an internal combustion engine for purifying exhaust gas, thereby accelerating purification (oxidation) of HC, CO in exhaust gas and warming the catalyst using reaction heat thereof in the secondary air supply systems.

When the secondary air supply systems cause a disorder, emission becomes degraded. Accordingly, a pressure sensor is provided to the secondary air supply pipe, so that an abnormality diagnosis is performed in accordance with pressure detected using the pressure sensor in the above secondary air supply systems.

As time elapses, the air pump discharging secondary air increases in temperature due to heat generated by a coil of a drive motor and heat of exhaust gas discharged from the engine. Pressure of exhaust gas is applied in the outlet of the secondary air supply passage. Therefore, as the pressure of the exhaust gas increases, a load of the air pump becomes high. As a result, a heat amount generated by the air pump increases, and increase in temperature of the air pump is apt to become large. As temperature of the air pump increases, resistance of the coil of the drive motor increases, consequently, the pumping performance of the air pump decreases. As a result, a flow amount (pressure) of secondary air may decrease. In this condition, when the abnormality diagnosis of the secondary air supply system is performed by detecting the amount (pressure) of secondary air, diagnosis of normality and abnormality of the secondary air supply system may be erroneously performed due to decrease in pumping performance of the air pump caused by increase in temperature of the air pump.

SUMMARY OF THE INVENTION

In view of the foregoing and other problems, it is an object of the present invention to produce an abnormality diagnosis apparatus for a secondary air supply system, the apparatus being capable of restricting erroneous diagnosis.

According to one aspect of the present invention, an abnormality diagnosis apparatus is used for a secondary air supply system for an internal combustion engine. The system includes an air pump for supplying secondary air into an upstream of a catalyst in an exhaust gas passage of the internal combustion engine. The catalyst purifies exhaust gas. The apparatus includes a secondary air detecting means, an abnormality diagnosis means, a temperature information determining means, and a condition setting means. The secondary air detecting means detects secondary air information. The abnormality diagnosis means performs an abnormality diagnosis of the secondary air supply system in accordance with the secondary air information. The temperature information determining means performs at least one of detection and estimation of air pump temperature information. The condition setting means performs at least one of setting and compensating a condition for evaluating normality and abnormality of the secondary air supply system in accordance with the air pump temperature information.

In this structure, the condition setting means sets the threshold at the value, which adapts to decrease in performance of the air pump caused by rise in temperature of the air pump. Thus, the abnormality diagnosis means can properly evaluate abnormality of the air pump, even when the air pump rises in temperature due to self-heating and/or heat exhausted from the engine. Consequently, the abnormality diagnosis means can restrict causing a misevaluation of the normality and abnormality of the secondary air supply system, even when a performance of the air pump decreases. Thus, the abnormality diagnosis means can steadily perform the abnormality diagnosis.

BRIEF DESCRIPTION OF THE DRAWINGS

The above and other objects, features and advantages of the present invention will become more apparent from the following detailed description made with reference to the accompanying drawings. In the drawings:

FIG. 4 is an example of a data map of $\Delta T$ according to the first embodiment;

FIG. 5 is an example of a data map of kTH according to the first embodiment;

DETAILED DESCRIPTION OF PREFERRED EMBODIMENTS

Embodiment

Figure 1:
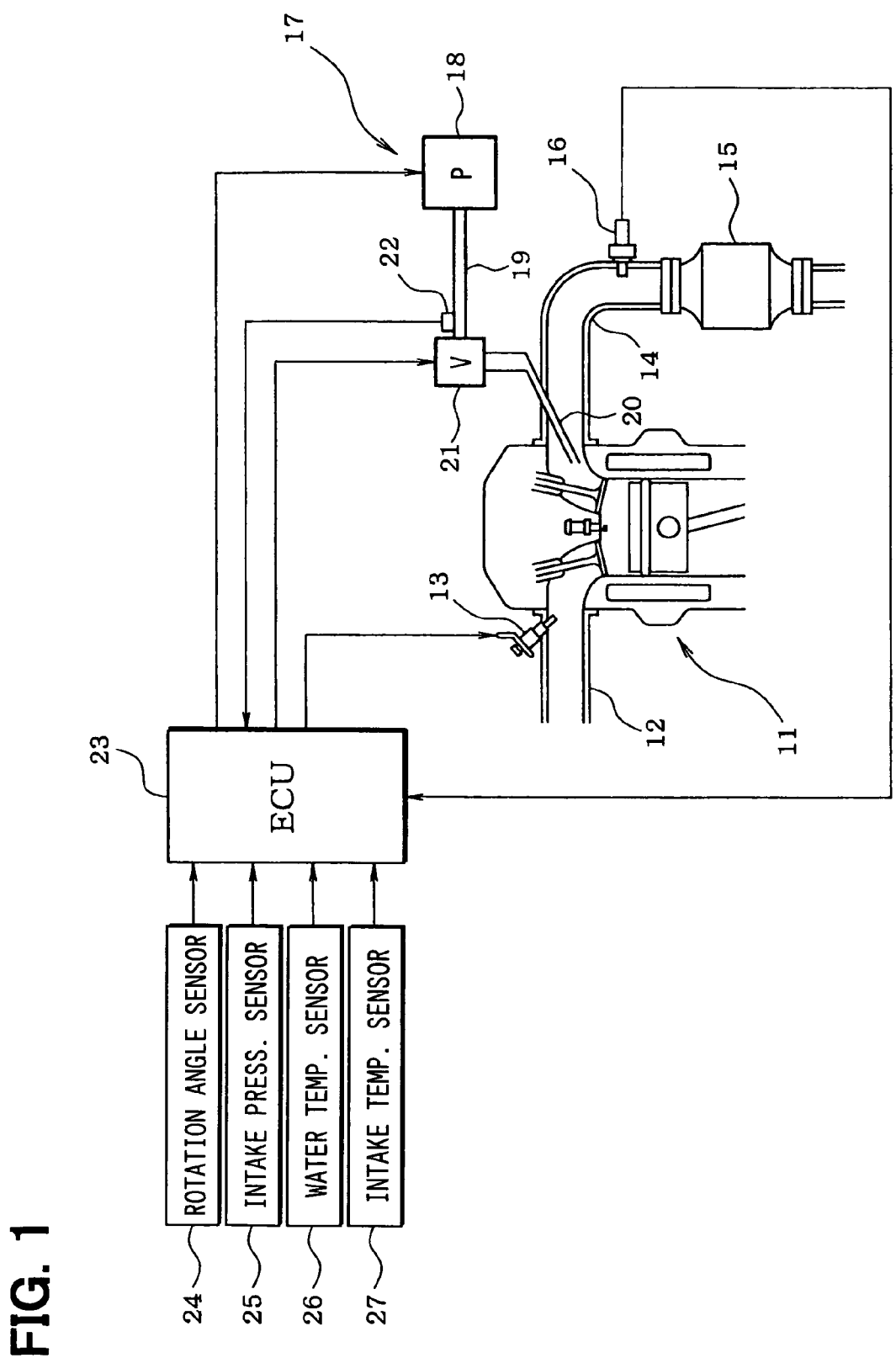
FIG. 1 is a schematic view showing an engine and a secondary air supply system according to a first embodiment of the present invention.

As shown in FIG. 1, fuel injection valves 13 are provided in the vicinity of intake ports of an intake manifold. Each fuel injection valve 13 is arranged to each cylinder in an internal combustion engine 11. A catalyst such as a three-way catalyst 15 is provided in an exhaust pipe (exhaust passage) of the engine 11 for purifying CO, HC, NOx, and the like contained in exhaust gas. An air/fuel ratio sensor 16 or an oxygen sensor is provided in the upstream of the catalyst 15 for detecting an air/fuel ratio or a rich/lean condition of exhaust gas.

A secondary air supply system 17 supplies secondary air to the upstream of the catalyst 15 in the exhaust pipe 14. Specifically, the secondary air supply system 17 introduces secondary air discharged from an air pump 18 through a discharge pipe 19, and distributes the exhaust gas into secondary air supply nozzles 20 of the respective cylinders. The air pump 18 is driven by an electric motor. A control valve 21 is provided to the discharge pipe 19 of the air pump 18 for opening and closing the passage of the discharge pipe 19. A pressure sensor 22 is provided between the control valve 21 and the air pump 18 in the discharge pipe 19. The pressure sensor 22 serves as a secondary air information detecting means (secondary air detecting means). The secondary air detecting means detects information related to a flow amount and pressure of the secondary air discharged from the air pump 18.

The air pump 18 and the control valve 21 of the secondary air supply system 17 are controlled using an engine control unit (ECU) 23. The ECU 23 reads various signals for detecting an operating condition of the engine 11. The various signals are detected using various sensors such as a rotation angle sensor 24, an intake pressure sensor 25, a water temperature sensor 26, and an intake temperature sensor 27. The ECU 23 detects the operating condition of the engine 11 in accordance with the various signals detected using the various sensors, so that the ECU 23 controls an injection amount of fuel and an ignition timing based on the operating condition of the engine 11.

Figure 2:
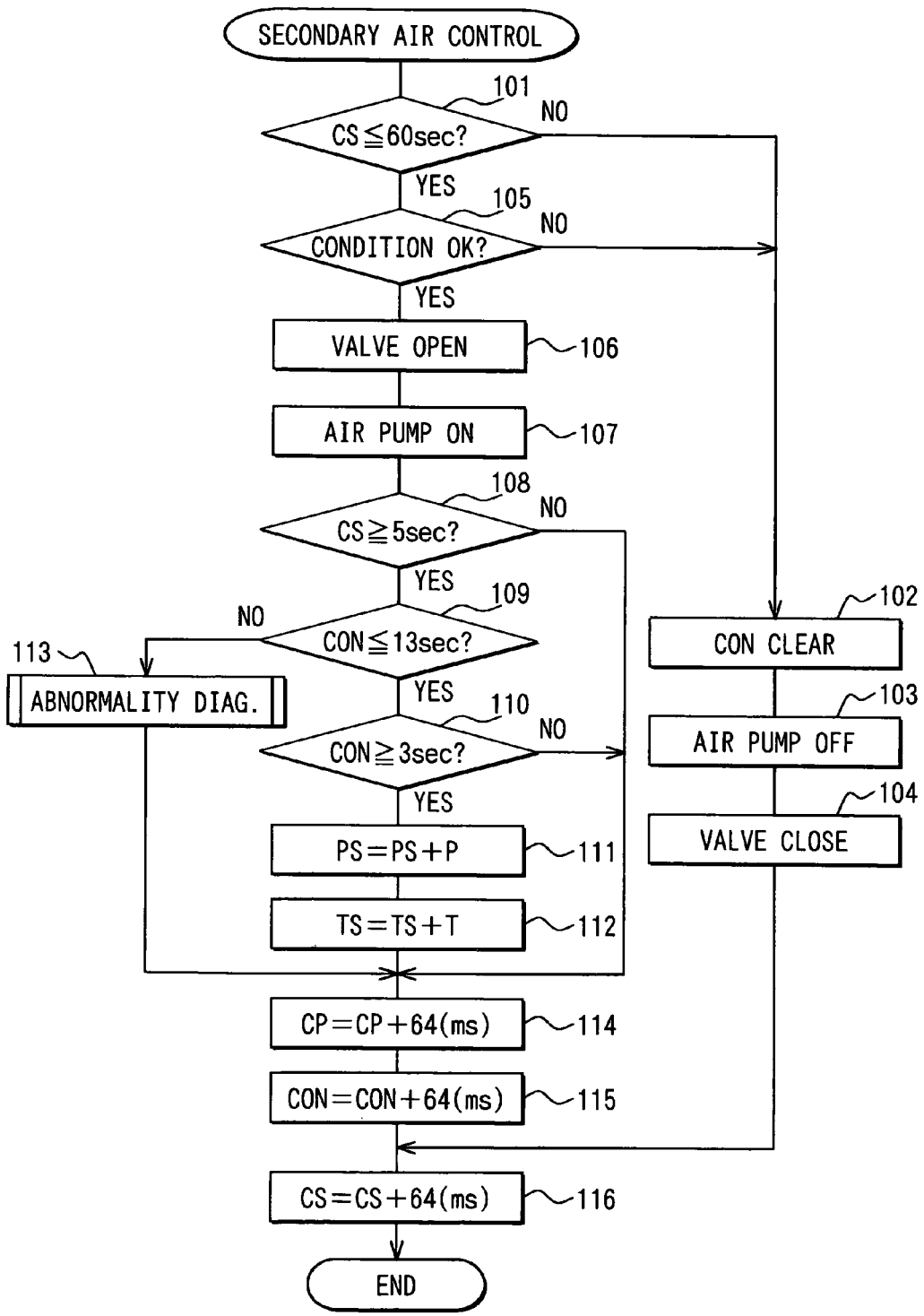
FIG. 2 is a flowchart showing a secondary air control routine according to the first embodiment.

The ECU 23 performs a secondary air control routine shown in FIG. 2, so that the ECU 23 controls the secondary air supply system 17 to perform an operation of secondary air supply. Besides, the ECU 23 performs an abnormality diagnosis routine shown in FIG. 3, so that the ECU 23 serves as an abnormality diagnosis means that evaluates normality and abnormality of the secondary air supply system 17.

Figure 6:
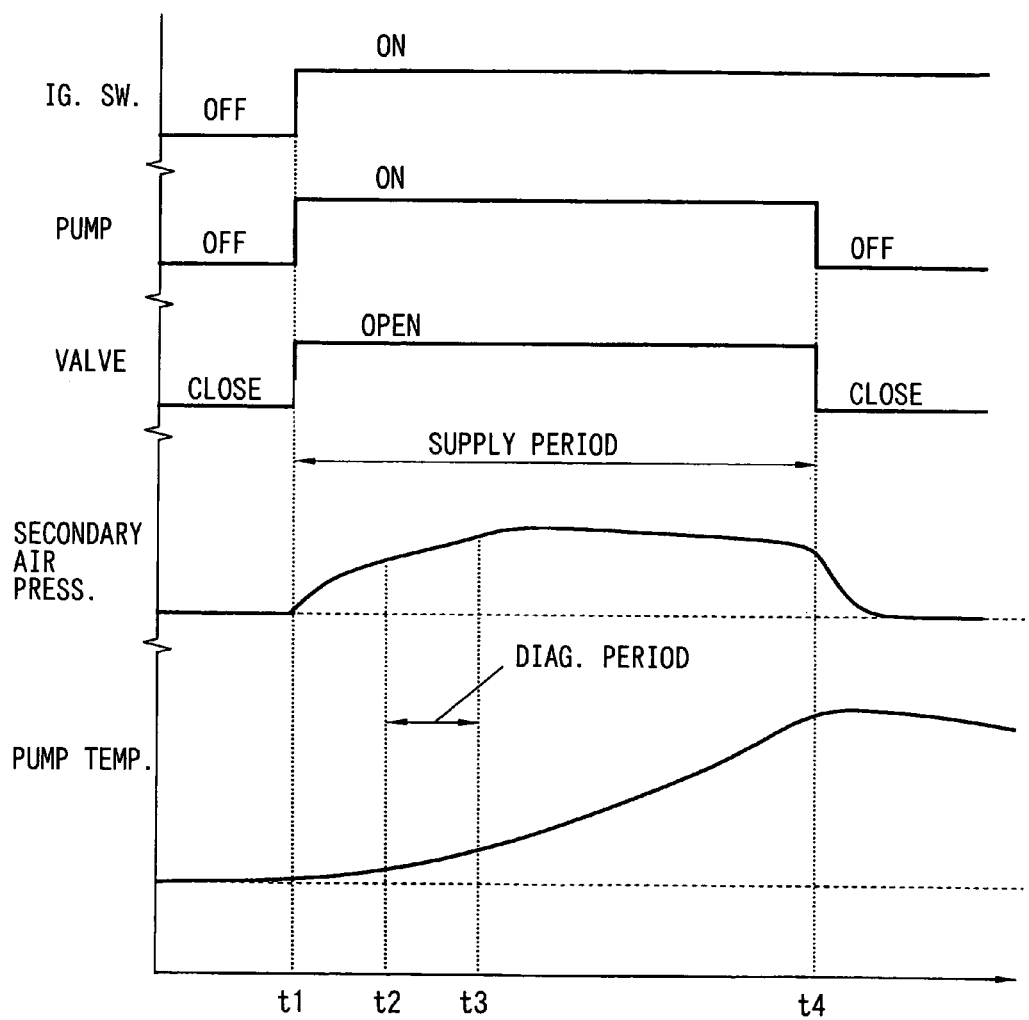
FIG. 6 is a timing chart showing an example of the abnormality diagnosis according to the first embodiment.

A method of the abnormality diagnosis of the secondary air supply system 17 is described in reference to FIG. 6. In this embodiment, a period (secondary air supply period), in which the secondary air supply system 17 supplies secondary air, is immediately after starting the engine 11. The ECU 23 controls initial catalyst warming operation in this situation, in general.

At the timing t1, a driver turns an ignition switch ON to start the engine 11. At the timing t1, the air pump 18 is started, and the control valve 21 is opened to start supplying secondary air. A predetermined time elapses subsequent to starting the operation of the air pump 18 at the timing t2. At the timing t2, the pressure sensor 22 starts detection of pressure (secondary air pressure) of secondary air. Subsequently, a predetermined time elapses at the timing t3, in which the detection of the secondary air pressure is terminated. The period between the timings t2-t3 is an abnormality diagnosis period, in which the secondary air pressure is detected.

The secondary air pressure is detected using the pressure sensor 22 in the abnormality diagnosis period (t2-t3) at regular intervals. The values of the secondary air pressure are integrated, and the integration value of the secondary air pressure in the abnormality diagnosis period is divided by the number of integration, so that an average secondary air pressure in the abnormality diagnosis period is calculated.

Furthermore, while the air pump 18 is operated, the ECU 23 estimates temperature of the air pump 18 in accordance with an amount of intake air, an operation time of the air pump 18, and temperature (intake air temperature) of intake air or the atmospheric temperature. Thus, the ECU 23 calculates average temperature of the air pump 18 in the abnormality diagnosis period (t2-t3). Specifically, the amount of intake air is used as an information, which is substitute as heat exhausted from the engine. Specifically, the ECU 23 determines initial temperature of the air pump 18 in accordance with the intake air temperature (or the atmospheric temperature) detected using the intake temperature sensor 27 (or an atmospheric temperature sensor). The ECU 23 repeats calculating temperature rise ΔT at a calculation interval in accordance with an amount (intake air amount) A of intake air and the operation time of the air pump 18 in reference to the data map shown in FIG. 4. The data map shown in FIG. 4 represents temperature rise ΔT at a calculation interval. The ECU 23 repeats integration of the calculated value of the temperature rise ΔT at the calculation interval, so that the ECU 23 repeatedly revises the air pump temperature.

The ECU 23 integrates the air pump temperature, which is estimated, while the abnormality diagnosis is performed. The ECU 23 divides the integration value of the air pump temperature in the period (abnormality diagnosis period), in which the abnormality diagnosis is performed, by the number of integration, so that the ECU 23 calculates average value (average air pump temperature) of the air pump temperature in the abnormality diagnosis period. As shown in FIG. 5, the ECU 23 sets the threshold kTH corresponding to the average air pump temperature in the abnormality diagnosis period in reference to the table of a threshold kTH shown in FIG. 5, for evaluating normality and abnormality of the secondary air supply system 17. The ECU 23 compares the average secondary air pressure in the abnormality diagnosis period with the threshold kTH, so that the ECU 23 evaluates normality and abnormality of the secondary air supply system 17 in an abnormality diagnosis process.

After finishing the abnormality diagnosis process, the ECU 23 continues supplying secondary air until substantially finishing warming the catalyst 15. At the timing t4, the ECU 23 turns the air pump 18 OFF, and closes the control valve 21, so that the ECU 23 terminates supplying secondary air into the exhaust pipe 14.

Figure 3:
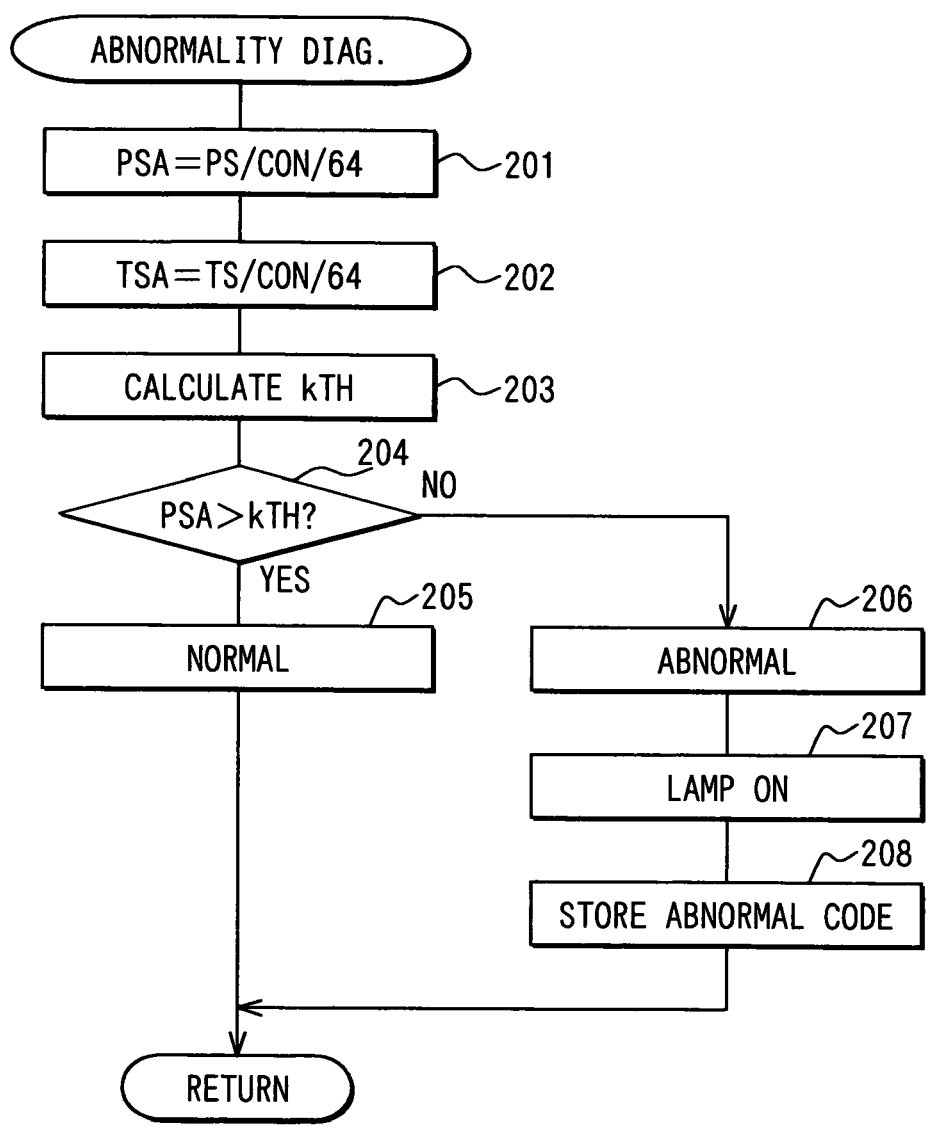
FIG. 3 is a flowchart showing an abnormality diagnosis routine for the secondary air supply system according to the first embodiment.

The ECU 23 performs the above abnormality diagnosis process of the secondary air supply system 17 in accordance with the routines shown in FIGS. 2, 3. Next, the process of the abnormality diagnosis process is described.

As shown in FIG. 2, the secondary air control routine is executed at regular intervals such as 64 ms, while the ignition switch is turned ON. When the routine is executed, the routine proceeds to step 101, in which it is evaluated whether a time (elapsed time) CS elapsed after starting the ignition is equal to or less than a predetermined time such as 60 sec, which is within the secondary air supply period. When the elapsed time CS is greater the predetermined time such as 60 sec, the routine proceeds to step 102, in which the ECU 23 clears, i.e., resets a timer for counting a time (abnormality diagnosis time) CON, in which the abnormality diagnosis is carried out. The routine proceeds to steps 103, 104, in which the ECU 23 turns the air pump 18 OFF, and closes the control valve 21, so that the ECU 23 completes the secondary air supply into the exhaust pipe 14.

By contrast, when it is determined that the elapsed time CS is equal to or less than the predetermined time such as 60 sec in step 101, the routine proceeds to step 105. In step 105, it is evaluated whether a condition for executing control (secondary air supply control) of secondary air supply is satisfied, in accordance with the following five conditions.

First, the secondary air supply control is not finished.

Second, temperature (water temperature) of cooling water detected using the water temperature sensor 26 is in a predetermined range.

Third, engine rotation speed is in an idling range.

Fourth, an engine load is in the idling range.

A variation in an electric load is equal to or less than a predetermined amount. Specifically, a high electrical load is not turned ON and OFF, for example.

When the above first to fifth conditions are satisfied, the condition for executing the secondary air control is satisfied. However, when at least one of the above five conditions is not satisfied, the condition for executing the secondary air control is not satisfied. When the condition for executing the secondary air control is not satisfied, the ECU 23 executes the process of steps 102 to 104. Specifically, the ECU 23 clears the timer of the abnormality diagnosis time CON, turns the air pump 18 OFF, and closes the control valve 21, so that the ECU 23 terminates the secondary air supply into the exhaust pipe 14.

By contrast, when the above five conditions are satisfied, the conditions for executing the secondary air control are satisfied, the routine proceeds to steps 106, 107, in which the ECU 23 opens the control valve 21, and turns the air pump 18 ON, so that the ECU 23 supplies secondary air into the exhaust pipe 14.

Subsequently, the routine proceeds to step 108, in which the ECU 23 evaluates whether the present timing is over an abnormality diagnosis starting timing. Specifically, the ECU 23 evaluates whether the present timing is over a timing for starting detection of the secondary air pressure. In step 108, the ECU 23 evaluates whether the elapsed time CS is equal to or greater than a predetermined time such as 5 sec. When the elapsed time CS is less than the predetermined time such as 5 sec, that is, the present timing is before starting the abnormality diagnosis, the routine proceeds to step 114. In step 114, the ECU 23 calculates an operation time CP of the air pump 18 by adding the calculation interval such as 64 ms to a counter, which counts the operation time CP of the air pump 18. Thus, the ECU 23 integrates the operation time CP of the air pump 18. The routine proceeds to step 115, in which the ECU 23 counts the abnormality diagnosis time CON by adding the calculation interval such as 64 ms to a counter, which counts the abnormality diagnosis time CON. When the engine is started, the counter, which counts the abnormality diagnosis time CON, is set at 0 as an initial value in an initializing process.

By contrast, in step 108, when it is determined that the elapsed time CS is equal to or greater than 5 sec, it is determined that the abnormality diagnosis can be started, so that the routine proceeds to step 109. In step 109, it is evaluated whether the abnormality diagnosis time CON is equal to or less than a predetermined time such as 13 sec. When it is determined that the abnormality diagnosis time CON is equal to or less than 13 sec, for example, the routine proceed to step 110. In step 110, it is evaluated whether the abnormality diagnosis time CON is equal to or greater than a predetermined time such as 3 sec. When it is determined that the abnormality diagnosis time CON is less than 3 sec, for example, a negative determination is made in step 110. In this case, the ECU 23 executes the routine in steps 114 to 116, in which the ECU 23 counts all the operation time CP of the air pump 18, the abnormality diagnosis time CON, and the elapsed time CS.

After repeating the secondary air supply routine shown in FIG. 2, when the abnormality diagnosis time CON becomes equal to or greater than 3 sec, for example, a positive determination is made in step 110, so that the routine proceeds to step 111. In step 111, the ECU 23 integrates the secondary air pressure P detected using the pressure sensor 22 to calculate an integration value (integrated secondary pressure) PS of the secondary air pressure P. Subsequently, the routine proceeds to step 112, in which the ECU 23 integrates the air pump temperature T to calculate an integrated value (integrated pump temperature) TS of the air pump temperature T. The air pump temperature T is estimated based on the intake air amount, the operation time CP of the air pump 18, and the intake air temperature (or the atmospheric temperature).

In this situation, the estimation of the air pump temperature T is performed in the following manner. First, the ECU 23 determines an initial value of the air pump temperature T based on the intake air temperature (or the atmospheric temperature) detected using the intake temperature sensor 27 (or an atmospheric temperature sensor).

The ECU 23 repeats calculating temperature rise $\Delta T$ at a calculation interval in accordance with the intake air amount A and the operation time CO of the air pump 18 in reference to the data map of temperature rise $\Delta T$ at a calculation interval shown in FIG. 4. The ECU 23 repeats integration ($T=T+\Delta T$) of the calculated value of the temperature rise $\Delta T$ at the calculation interval, so that the ECU 23 repeatedly revises the air pump temperature T. Thus, the ECU 23 estimates the air pump temperature T to calculate the integrated pump temperature TS.

As referred to FIG. 4, as the intake air amount A becomes large, and as the operation time CP of the air pump 18 becomes long, the temperature rise $\Delta T$ at the calculation interval is set to become large. Specifically, as the intake air amount A becomes large, an amount of heat exhausted from the engine is estimated to be large, so that the temperature rise $\Delta T$ at the calculation interval is set large. The operation that estimates the air pump temperature, specifically the integrated pump temperature TS in step 112 serves as a temperature information determining means.

Next, in step 109, when the abnormality diagnosis time CON becomes greater than 13 sec, for example, a negative determination is made in step 109, so that the ECU 23 determines that the abnormality diagnosis period is completed. Specifically, in this condition, the ECU 23 determines that a condition for executing an abnormality diagnosis routine for the secondary air supply system shown in FIG. 3 is satisfied. The routine proceeds to step 113, in which the ECU 23 executes an abnormality diagnosis routine for the secondary air supply system shown in FIG. 3, so that that ECU 23 evaluates normality and abnormality of the secondary air supply system 17 in the following manner.

First, in step 201, the ECU 23 divides the integrated secondary pressure PS by the number of integration (integration number), so that the ECU 23 calculates an average value (average secondary pressure, PSA) of the secondary air pressure in the abnormality diagnosis period.

$$PSA=PS/CON/64$$

In this case, the calculation interval is 64 ms in step 115, accordingly the integration number is CON/64, for example.

Subsequently, the routine proceeds to step 202, in which the ECU 23 divides the integrated pump temperature TS by the integration number such as CON/64, so that the ECU 23 calculates an average value (average pump temperature) TSA of the air pump temperature in the abnormality diagnosis period.

$$TSA=TS/CON/64$$

Subsequently, the routine proceeds to step 203, in which the ECU 23 calculates the threshold kTH corresponding to the average pump temperature TSA in reference to the table of the threshold kTH in FIG. 5. The operation in step 203 serves as a condition setting means.

Subsequently, the routine proceeds to step 204, in which the ECU 23 compares the average secondary pressure PSA with the threshold kTH. When the average secondary pressure PSA is greater than the threshold kTH, the routine proceeds to step 205, in which it is determined that the secondary air supply system 17 is normal.

By contrast, in step 204, when the average secondary pressure PSA is equal to or less than the threshold kTH, the routine proceeds to step 206, in which it is determined that the secondary air supply system 17 is abnormal. In the following step 207, the ECU 23 turns a warning lamp (not shown) ON or blinks the warning lamp. Alternatively, the ECU 23 displays a warning indication on a display device of an instrument panel in the driver seat. In the following step 208, the ECU 23 stores an information of abnormality such as an abnormal code in a rewritable non-volatile memory such as a back-up RAM in the ECU 23.

In the above embodiment, the ECU 23 sets the threshold for evaluating normality and abnormality of the secondary air supply system 17 in accordance with the air pump temperature (average pump temperature TSA). Therefore, the ECU 23 sets the threshold at the value, which adapts to decrease in performance of the air pump 18 caused by rise in temperature of the air pump 18. Thus, the ECU 23 can properly evaluate abnormality of the air pump 18, even when the air pump 18 rises in temperature due to self-heating of the air pump 18 and/or due to heat exhausted from the engine 11 in the abnormality diagnosis period. Consequently, the ECU 23 can restrict causing a misevaluation of the normality and abnormality of the secondary air supply system 17, even when a performance of the air pump 18 decreases due to rise in temperature of the air pump 18. Thus, the ECU 23 can steadily perform the abnormality diagnosis.

Furthermore, in this embodiment, the ECU 23 estimates temperature of the air pump 18 in accordance with the intake air amount, the operation time of the air pump 18, and the intake air temperature (or the atmospheric temperature). The intake air amount is substituted for representing heat exhausted from the engine.

As described in reference to FIG. 4, as the operation time of the air pump becomes long, and as heat of exhausted gas increases, the air pump temperature T rises, in general. The initial value of the air pump temperature T, that is, temperature of the air pump immediately after starting the air pump depends on the intake temperature or the atmospheric temperature. The heat of exhausted gas may be calculated based on the intake air amount, for example. A sensor for detecting temperature of intake air or a sensor for detecting the atmosphere temperature may be provided to the vehicle for controlling the engine. In this case, temperature of intake air or the atmosphere temperature can be used as information for estimating the initial value of the air pump temperature. Therefore, the temperature information of the air pump can be obtained by estimating the information of the air pump temperature in accordance with the operation time of the air pump, the heat of exhaust gas, the intake air temperature, and the like, without adding a temperature sensor to the air pump. More, specifically, a parameter, which relates to at least one of operation time of the air pump, heat of exhaust gas, temperature of intake air, and the like can be also used for estimating the information of the air pump temperature. Thus, the secondary air supply system can be reduced in cost.

Therefore, the ECU 23 can estimate the air pump temperature, without adding a temperature sensor to the air pump 18, so that cost of the secondary air supply system 17 can be reduced.

The ECU 23 may determine the initial value of the air pump temperature T in accordance with temperature of cooling water detected using the water temperature sensor 26, when the vehicle that does not have an intake temperature sensor (or an atmospheric temperature sensor). Alternatively, the ECU 23 may use the intake air amount and rotation speed of the engine as information substitute for heat exhausted from the engine. A temperature sensor is added to the air pump 18 as the temperature information determining means to directly detect the air pump temperature.

In this embodiment, the ECU 23 sets the threshold for evaluating normality and abnormality of the secondary air supply system 17 in accordance with the air pump temperature (average pump temperature TSA). Instead of this method, the ECU 23 may correct the secondary air pressure (average secondary pressure PSA) in accordance with the air pump temperature.

Second Embodiment

Figure 7:
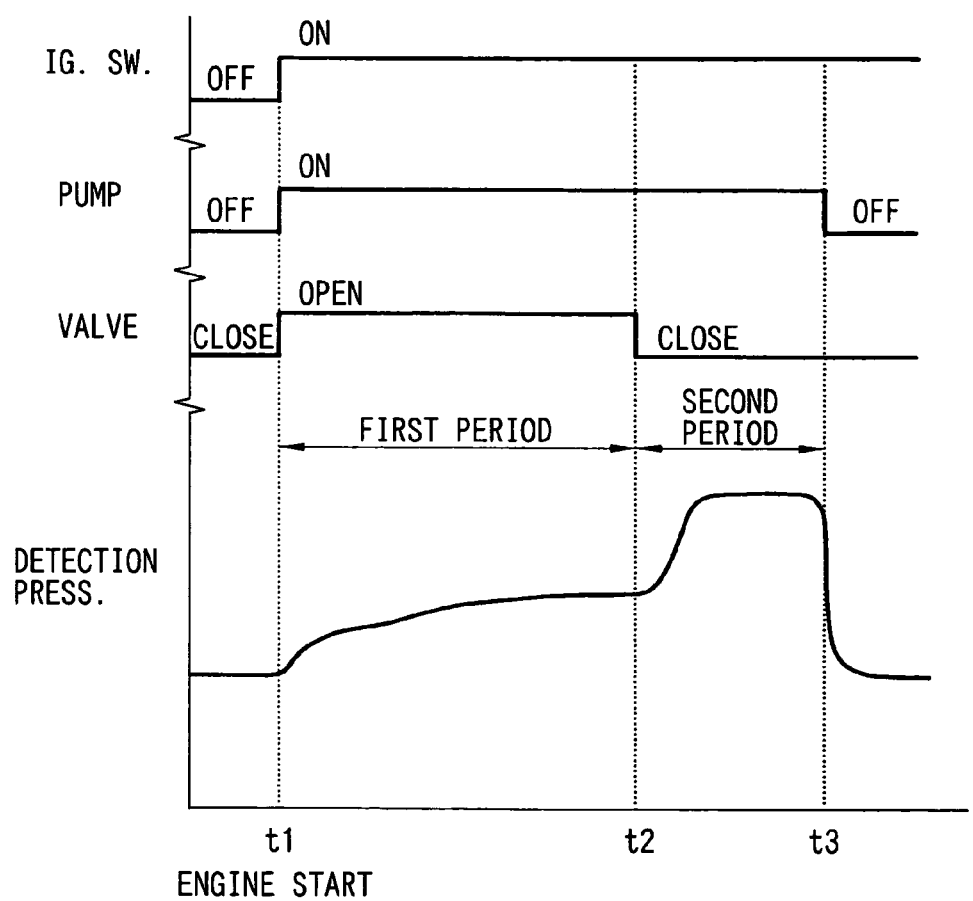
FIG. 7 is a timing chart showing an example of an abnormality diagnosis for the secondary air supply system according to a second embodiment of the present invention.

The method for determining normality and abnormality of the secondary air supply system 17 described in the first embodiment can be variously modified. For example, as shown in FIG. 7, the driver turns the ignition switch ON to start the air pump 18 at the timing t1, and a predetermined time elapses at the timing t2, in which the ECU 23 closes the control valve 21 to stop secondary air supply into the exhaust pipe 14. After the timing t2, the ECU 23 continues operation of the air pump 18 for a predetermined period for evaluating normality and abnormality of the secondary air supply system 17.

The period from the timing t1, in which the ECU 23 starts the operation of the air pump 18, to the timing t2, in which the ECU 23 closes the control valve, is referred as a first detecting period (t1-t2). The period from the timing t2, in which the ECU 23 closes the control valve, to the timing t3, in which the ECU 23 stops the air pump 18, is referred as a second detecting period (t2-t3).

The ECU 23 integrates the secondary air pressure detected using the pressure sensor 22 at the regular interval in the first detecting period (t1-t2). The ECU 23 divides the integrated secondary pressure in the first detecting period (t1-t2) by the number of integration, so that the ECU 23 calculates the average secondary pressure in the first detecting period. Subsequently, ECU 23 integrates the secondary air pressure detected using the pressure sensor 22 at the regular interval in the second detecting period (t2-t3). The ECU 23 divides the integrated secondary pressure in the second detecting period (t2-t3) by the number of integration, so that the ECU 23 calculates the average secondary pressure in the second detecting period. Next, the ECU 23 calculates the difference between the average secondary pressure in the first detecting period and the average secondary pressure in the second detecting period. The ECU 23 (abnormality diagnosis means) evaluates whether this difference is equal to or greater than a threshold, so that the ECU 23 determines normality and abnormality of the secondary air supply system 17. In this condition, the ECU 23 sets the threshold in accordance with the average pump temperature of the air pump, which may be calculated in the substantially the same manner as described above.

In the above embodiment, the pressure sensor 22 detects the secondary air pressure as the secondary air information. However, an amount of secondary air discharged from the air pump 18 may be detected and used as the secondary air information.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An abnormality diagnosis apparatus for a secondary air supply system for an internal combustion engine, the system including an air pump for supplying secondary air into an upstream of a catalyst in an exhaust gas passage of the internal combustion engine, the catalyst purifying exhaust gas, and the air pump being driven by an electric motor, the apparatus comprising:
   a secondary air detector that detects secondary air information;
   an abnormality diagnosis section having a configuration that performs an abnormality diagnosis of the secondary air supply system in accordance with the secondary air information;
   a temperature information determining section having a configuration that performs at least one of detection and estimation of air pump temperature of the air pump driven by the electric motor; and
   a condition setting section having a configuration that performs at least one of setting and compensating a condition for evaluating normality and abnormality of the secondary air supply system in accordance with the air pump temperature;
   wherein the abnormality diagnosis section performs the abnormality diagnosis by comparing the secondary air information with the condition set or compensated by the condition setting section.

2. The apparatus according to claim 1,
   wherein the temperature information determining section performs estimation of the air pump temperature in accordance with the following conditions:
   at least one of operation time of the air pump, heat of exhaust gas, and temperature of intake air; and
   at least one parameter, which is associated with at least one of the operation time of the air pump, the heat of exhaust gas, and the temperature of intake air.

3. The apparatus according to claim 1, wherein the secondary air information is associated with at least one of a flow amount and pressure of the secondary air supplied from the air pump.

4. The apparatus according to claim 2, wherein the temperature information determining section performs estimation of the air pump temperature in accordance with atmospheric temperature instead of the temperature of intake air.

5. The apparatus according to claim 2, wherein the temperature information determining section estimates the air pump temperature in accordance with an amount of intake air instead of the heat of exhaust gas.

6. The apparatus according to claim 1, wherein the secondary air detector is a pressure sensor, and the secondary air information is pressure detected using the pressure sensor.

7. The apparatus according to claim 1,
   wherein the secondary air detector is a flowmeter, and
   the secondary air information is an amount of secondary air supplied from the air pump detected using the flowmeter.

8. The apparatus according to claim 1, wherein the system further includes a valve for opening and closing a discharge pipe of the air pump,
   the apparatus further comprising:
   a controller that controls the air pump and the valve, wherein the controller opens the valve and operates the air pump in a first detection period,
   the controller closes the valve and continues operating the air pump in a second detection period, and
   the abnormality diagnosis section performs the abnormality diagnosis in accordance with a difference between the secondary air information in the first detection period and the secondary air information in the second detection period.

9. An abnormality diagnosis apparatus for a secondary air supply system for an internal combustion engine, the system including an air pump for supplying secondary air into an upstream of a catalyst in an exhaust gas passage of the internal combustion engine, the catalyst purifying exhaust gas, and the air pump being driven by an electric motor, the system further including a valve for opening and closing a discharge pipe of the air pump, the apparatus comprising:
   a controller that opens the valve and operates the air pump in a first detection period, the controller closing the valve and continues operating the air pump in a second detection period;
   a secondary air detector that detects secondary air information;
   an abnormality diagnosis section having a configuration that performs the abnormality diagnosis in accordance with a difference between the secondary air information in the first detection period and the secondary air information in the second detection period;
   a temperature information determining section having a configuration that performs at least one of detection and estimation of air pump temperature of the air pump driven by the electric motor; and
   a condition setting section having a configuration that performs at least one of setting and compensating of a condition for evaluating normality and abnormality of the secondary air supply system in accordance with the air pump temperature;
   wherein the abnormality diagnosis section performs the abnormality diagnosis by comparing the difference with the condition set or compensated by the condition setting section.

10. The apparatus according to claim 9,
    wherein the temperature information determining section performs estimation of the air pump temperature in accordance with the following conditions:
    at least one of operation time of the air pump, heat of exhaust gas, and temperature of intake air; and
    at least one parameter, which is associated with at least one of the operation time of the air pump, the heat of exhaust gas, and the temperature of intake air.

11. The apparatus according to claim 9, wherein the secondary air information is associated with pressure of the secondary air supplied from the air pump.

12. The apparatus according to claim 10, wherein the temperature information determining section performs estimation of the air pump temperature in accordance with atmospheric temperature instead of the temperature of intake air.

13. The apparatus according to claim 10, wherein the temperature information determining section estimates the air pump temperature in accordance with an amount of intake air instead of the heat of exhaust gas.

14. The apparatus according to claim 11, wherein the secondary air detecting section is a pressure sensor, and the secondary air information is pressure detected using the pressure sensor.

15. An method of diagnosing an abnormality of a secondary air supply system for an internal combustion engine, the system including an air pump for supplying secondary air into an upstream of a catalyst in an exhaust gas passage of the internal combustion engine, the catalyst purifying exhaust gas, and the air pump being driven by an electric motor, the method comprising:

detecting secondary air information;

performing an abnormality diagnosis of the secondary air supply system in accordance with the secondary air information;

performing at least one of detection and estimation of air pump temperature of the air pump driven by the electric motor; and performing at least one of setting and compensating a condition for evaluating normality and abnormality of the secondary air supply system in accordance with the air pump temperature:

wherein performing the abnormality diagnosis includes comparing the secondary air information with the condition.

16. The method according to claim 15, wherein performing at least one of detection and estimation of air pump temperature of the air pump driven by the electric motor includes performing estimation of the air pump temperature in accordance with the following conditions:

at least one of operation time of the air pump, heat of exhaust gas, and temperature of intake air; and at least one parameter, which is associated with at least one of the operation time of the air pump, the heat of exhaust gas, and the temperature of intake air.

17. The method according to claim 15, wherein the secondary air information is associated with at least one of a flow amount and pressure of the secondary air supplied from the air pump.

18. The method according to claim 16, wherein performing at least one of detection and estimation of air pump temperature of the air pump driven by the electric motor includes performing estimation of the air pump temperature in accordance with atmospheric temperature instead of the temperature of intake air.

19. The method according to claim 16, wherein performing at least one of detection and estimation of air pump temperature of the air pump driven by the electric motor includes performing estimation of the air pump temperature in accordance with an amount of intake air instead of the heat of exhaust gas.

20. The method according to claim 15, wherein the secondary air information is data corresponding to pressure detected using a pressure sensor.

21. The method according to claim 15, wherein the secondary air information is data corresponding to an amount of secondary air supplied from the air pump detected using a flow meter.

22. The method according to claim 15, wherein the system further includes a valve for opening and closing a discharge pipe of the air pump and the method further comprises:

controlling the air pump and the valve, wherein the controlling includes opening the valve and operating the air pump in a first detection period, the controlling includes closing the valve and continuing operation of the air pump in a second detection period, and performing the abnormality diagnosis in accordance with a difference between the secondary air information in the first detection period and the secondary air information in the second detection period.

* * * * *